United States Patent [19]

Ponczek

[11] 4,441,378

[45] Apr. 10, 1984

[54] GEARBOX DRIVE FOR A SPEEDOMETER

[75] Inventor: George M. Ponczek, Chicago, Ill.

[73] Assignee: Stewart-Warner Corporation, Chicago, Ill.

[21] Appl. No.: 228,329

[22] Filed: Jan. 26, 1981

[51] Int. Cl.$^3$ .......................... F16H 1/06; F16H 1/20
[52] U.S. Cl. ........................................ 74/414; 74/397;
74/401; 74/413; 74/421 R; 74/606 R
[58] Field of Search .................... 74/606 R, 414, 413,
74/401, 397, 421 R

[56] References Cited

U.S. PATENT DOCUMENTS

| | | | |
|---|---|---|---|
| 1,712,956 | 5/1929 | Gustafson | 74/397 |
| 2,669,881 | 2/1954 | Skidmore | 74/421 R |
| 2,888,831 | 6/1959 | Malcom | 74/606 X |
| 3,246,538 | 4/1966 | Easton | 74/606 |
| 3,422,695 | 1/1969 | Wilson et al. | 74/606 |
| 4,173,147 | 11/1979 | Zathy | 74/414 X |

*Primary Examiner*—Alfred C. Perham
*Attorney, Agent, or Firm*—Augustus G. Douvas

[57] ABSTRACT

A gearbox drive that adapts the drive train ratios of vehicles to standard speedometers, including an input gear, an intermediate gear and an output gear rotatable about axes defining an equilateral triangle, arranged so that upon rotation of the input shaft in either direction, the reaction forces on the intermediate gear will be substantially balanced. The gears are supported in mating cup-shaped input and output gear cases with the input gear case member having an input gear bearing and two secondary bearings each of which selectively supports either the intermediate gear or the output gear. The output gear case member has an output gear bearing and two secondary bearings each of which selectively supports either the intermediate gear or the input gear. By rotating the output gear case member 120 degrees with respect to the input gear case member during assembly and reversing the relative positions of the input and output gears, the same force balance on the intermediate gear is achieved for rotational motion of the input gear in either direction. The gearbox also accommodates reverse rotation of the output gear by eliminating the intermediate gear and directly meshing the input and output gears. The gear case members are constructed of plastic to reduce the weight and cost of the gearbox, while certain bushings along with the gears and their supporting shafts are constructed of steel to maintain the reliability, strength and integrity of the gearbox.

16 Claims, 12 Drawing Figures

GEARBOX DRIVE FOR A SPEEDOMETER

BACKGROUND OF THE PRESENT INVENTION

A variety of gearboxes or "adaptors" as they are sometimes referred to in the trade, have been provided for driving speedometers or odometers at speeds that reflect the actual speed of or distance traveled by the associated vehicle. Since the internal gearing within speedometers and odometers have become standardized and since drive ratios in the drive train between the vehicle's transmission output shaft and wheels vary from vehicle to vehicle, the adaptor or gearbox is necessary to reflect actual vehicle speed and distance traveled.

One such gearbox includes a split metal housing supporting input gearing which drives intermediate gearing that in turn rotates an output gear so that the direction of rotation of the input gear and the output gear are the same and the intermediate gearing performs an idler function as well as a gear ratio function. The shafts supporting these gears lie in a common plane and for a direction of rotation of the input gear in either direction, it can be shown that the reaction forces of the input gear and the output gear on the intermediate gear are substantially in the same direction on the same side of the common plane. These reaction forces on the intermediate gearing decrease gear train efficiency and require high strength bearings for the intermediate gear, usually a steel bearing. While it may be desirable to construct this prior gear box with a less expensive housing material such as plastic, it is doubtful because of the side loadings on the intermediate gear that such a gear box could be designed without the interposition of heavy duty metal bearings.

It is a primary object of the present invention to ameliorate the problems noted above in prior speedometer adaptors.

SUMMARY OF THE PRESENT INVENTION

In accordance with the present invention, a lightweight, reliable, efficient and low cost gearbox is provided for a speedometer drive in a vehicle in which the forces are balanced on portions of the contained gearing regardless of the direction of rotation of its input shaft.

The gearbox includes input and output plastic, preferably nylon, gear case members that are generally triangular in configuration. The input gear case member has a main bearing, a steel bushing, for supporting an input gear shaft, and two secondary bearings located on axes that together define an equilateral triangle. The output gear case has a main bearing that supports an output gear shaft and two secondary bearings located on axes that together define an equilateral triangle coincident with the equilateral triangle defined by the bearings in the input gear case. An intermediate gearing assembly has a shaft selectively received in either one of the secondary bearings in the input gear case and either one of the secondary bearings in the output gear case.

The equilateral positioning of the bearings in the input and output gear cases, positions the input, intermediate and output gears in a position such that upon rotation of the input gear in one direction, the reaction forces imposed upon the intermediate gears by the input gear and the output gear will be equal and opposite, thus balancing the forces and thereby increasing the efficiency of the gear train enabling the intermediate gears to be mounted in the plastic gear case members without any special bearings.

The present adaptor also eliminates side loading of the intermediate gear for reverse or counterclockwise rotation of the input shaft by permitting a repositioning of the input and output gears with respect to the intermediate gear during assembly. This repositioning effects a reversal of the input and output gears with respect to the intermediate gears that results in balanced forces on the intermediate gears. Toward this end, the input and output gear cases each have three equi-angularly spaced locating and fastening elements that permit the output case to be selectively mounted to the input case in one of two 120 degree spaced positions.

During assembly of the adaptor for counterclockwise rotation of the input gear, the output gear case is effectively rotated 120 degrees (from the clockwise input rotation position) with respect to the input gear case, the intermediate gear is shifted from one aligned set of secondary bearings in the gear cases to another aligned set of secondary bearings, the secondary bearings for the input and the output gears are reversed, and the geometric positions of the input and output gears with respect to the intermediate gear are reversed—and these changes result in the reaction forces of the input and output gears on the intermediate gears being balanced.

This gearbox with its improved efficiency and particularly its equal gear train efficiency whether driven in a clockwise or counterclockwise direction has the capability of accepting several hundred direct ratios, i.e., rotation of the output shaft in the same direction as the input shaft. Moreover, by eliminating the intermediate gears, a reverse rotation gear box may be provided by directly meshing the input gear with the output gear. The gears, gear shafts and mounting sleeves are heat treated steel for strength, long wear and high temperature resistance. The nylon gear case is filled with a silicone lubricant for lubricity, strength and corrosion resistance. Moreover, the input and output gear case members are differentially color coded for easy identification.

A "temperature-life" endurance test on the present gearbox adaptor was conducted at a temperature between zero degrees and 100 degrees Fahrenheit at an effective speed of ten to ninety miles an hour under a normal speedometer load for in excess of 100,000 miles with no failures. A vibration test was also conducted with a high frequency vibration amplitude of 0.060 inches at a frequency of 10 hz. to 250 hz. for 30 minute cycles and after 200 hours no failures occurred. Moreover, no adverse effects were found after a 200 hour humidity test at 100 degrees Fahrenheit and 98% relative humidity. An impact vibration test was conducted and resulted in no failures after 300 hours at an amplitude of 0.125 inches, a frequency of 860 cpm (cycles per minute) and an effective speed of 80 miles per hour. The adaptor showed no adverse effects from an impact shock test of thirty shocks of 100 GS each, in each of two planes.

DETAILED DESCRIPTION OF THE PREFERRED EMBODIMENT

Referring to the drawings and particularly FIGS. 1 to 7, an adaptor 10 is illustrated having a rectangular input drive tip 11 adapted to be driven, usually through flexible shafting, from one of the driven elements of the drive train of an associated vehicle, and an output drive shaft 12 adapted to be coupled to the input shaft of a speedometer-odometer assembly. The adapter 10, by the appropriate selection of its internal gearing, provides the correct drive ratio between an element in the vehicle drive train and the speedometer. It also accommodates both blockwise and counterclockwise rotation of input shaft 11 and with minor modification of its gearing, provides for reverse rotation of output shaft 12.

Toward these ends, the gearbox-adaptor 10 is seen to generally include a triangular input gear case 14 and a generally triangular mating output gear case 16 that house an input gear assembly 18 driven by input tip 20, an intermediate gear assembly 19 driven by the input gear assembly 18 and an output gear assembly 20 driven by intermediate gearing 19 and driving output shaft 12. By the appropriate selection of the size of the gears in gear assemblies 18, 19 and 20, a wide variety of gear ratios can be effected between input tip 11 and output shaft 12.

The input gear case 14 is generally cup-shaped and triangular in configuration and is preferably constructed of a plastic such as nylon. Case 14 has an outwardly extending enlarged boss 21 that receives a stepped annular metal input bushing 22 as seen clearly in FIG. 2. Input bushing 22 has an outer flange 23 that retains an internally threaded metal fitting 24 in position. Fitting 24 is adapted to be threaded to a fitting on the end of a standard flexible speed sender shaft. Bushing 22 has a reduced cylindrical section 26 that fits within a bore 27 in boss 21. Inner end 28 of bushing 22 is tapered and has an outer annular recess receiving a washer 29 that holds bushing shoulder 30 against boss 21 and locks bushing 22 in the gear case 14.

Figure 1:
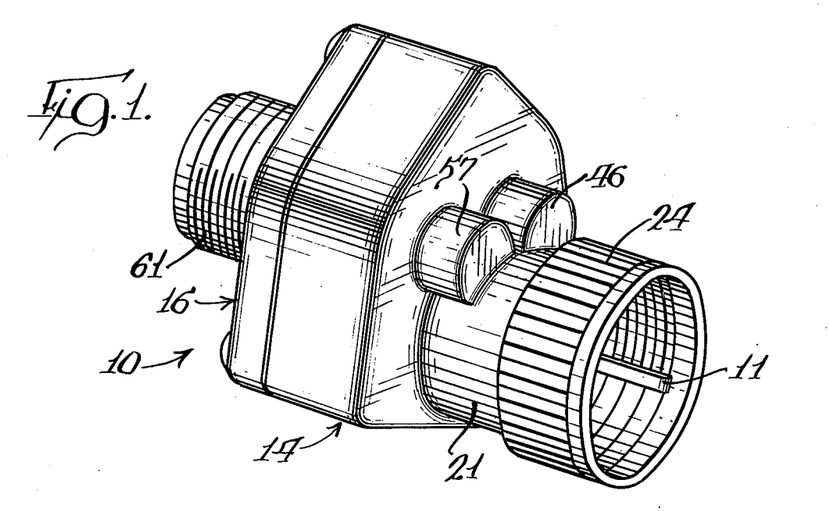
FIG. 1 is a perspective view of the present gearbox adaptor viewed from the input side toward the output side.
Figure 2:
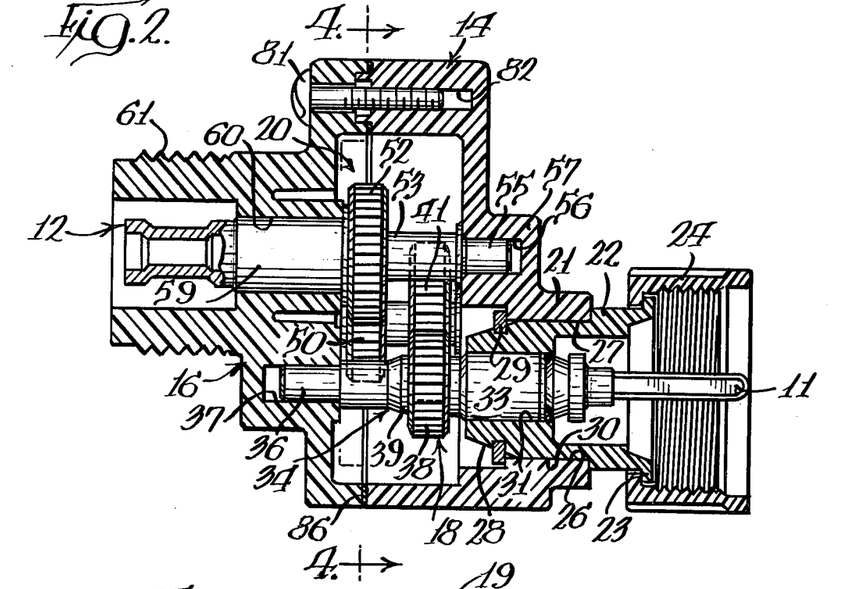
FIG. 2 is an irregular cross-section of the adaptor illustrated in FIG. 1 taken through the input and output shafts taken generally along line 2—2 of FIG. 8.
Figure 3:
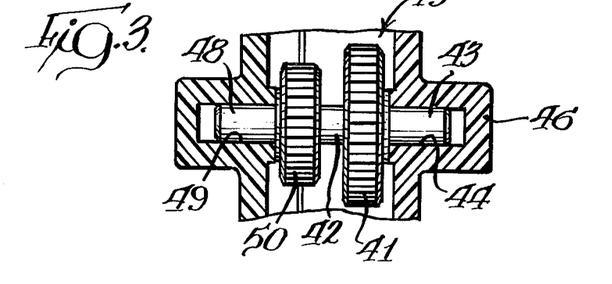
FIG. 3 is a fragmentary section of the adaptor shown in FIG. 2 taken through the intermediate gearing shaft.

The bushing 22 has an internal bearing bore 31 that rotatably receives an enlarged cylindrical bearing portion 33 on input shaft 34. The opposite end of input shaft 34 has a reduced cylindrical bearing portion 36 rotatably received in a closed end bearing bore 37 in gear case 16. An input gear 38 is pressed on cylindrical central portion 39 of input shaft 34.

The input gear 38 is engaged with and drives a larger gear 41 in intermediate gearing 19 pressed on intermediate gear shaft 42. Intermediate gear shaft 42 has a cylindrical end portion 43 rotatably mounted in a closed end secondary bore formed in and defined by a boss 46 on gear case 14. The opposite cylindrical end portion 48 to intermediate shaft 42 is rotatably mounted in closed end bore 49 defined in gear case 16. Shaft 42 has a smaller gear 50 pressed thereon that engages and drives an output gear 52 in output gearing 20 pressed on a reduced section 53 of output shaft 12.

As seen in FIG. 2, output shaft 12 has a reduced cylindrical bearing portion 55 at its right end rotatably received in a closed end bore 56 in gear case 14 defined by boss 57. The output shaft 12 has an enlarged cylindrical bearing portion 59 that is rotatably mounted in main cylindrical output bearing bore 60 in gear case 16. An outwardly extending externally threaded boss 61 is formed intergrally with output gear case 16 and is adapted to receive a suitable fitting connected to the instrument to be driven along with a drive tip that fits within the internal bore of output shaft 12.

Figure 4:
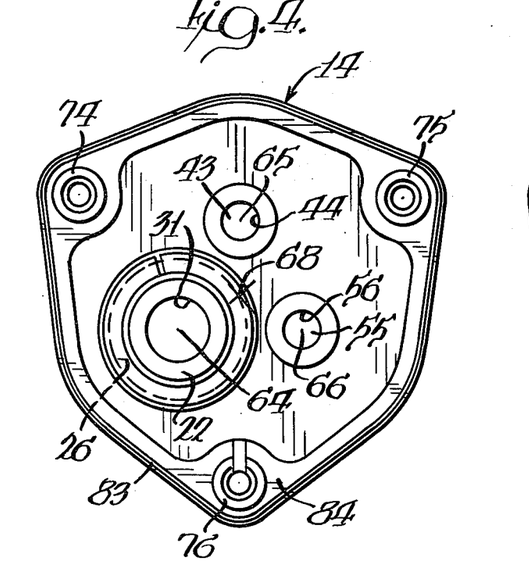
FIG. 4 is a front view of the inside of the input gear case.
Figure 5:
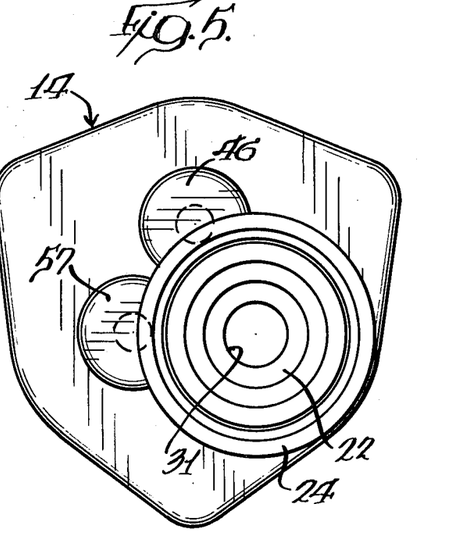
FIG. 5 is a back view of the outside of the input gear case.
Figure 6:
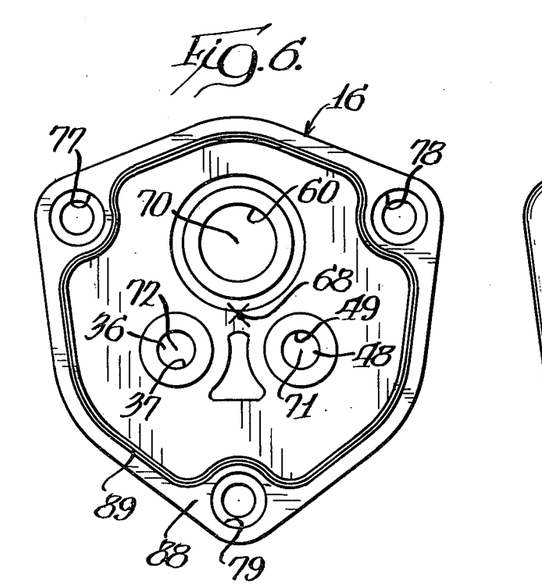
FIG. 6 is a front view of the inside of the output gear case.
Figure 7:
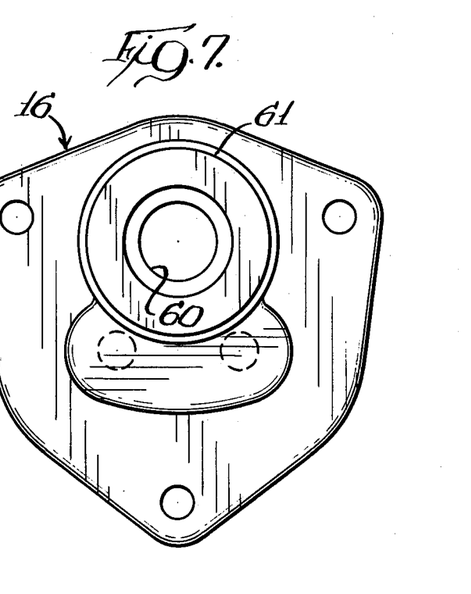
FIG. 7 is a back view of the outside of the output gear case.

As seen in FIG. 4, the axes 64, 65 and 66 of bushing 22, secondary bearing bore 44, and secondary bearing bore 56 respectively, in gear case 14, define the apexes of an equilateral triangle and lie on a common circle having a center at 68. Similarly as seen in FIG. 6, bearing bore 60, secondary bearing bore 49 and secondary bearing bore 37 have axes 70, 71 and 72, respectively, in gear case 16, define the apexes of an equilateral triangle and lie on a common circle having a center of 68', coaxial with center 68 defined by the axes 64, 65 and 66 in gear case member 14.

The gear case member 14 is located with respect to the gear case member 16 by three equi-angularly spaced integral annular projections 74, 75 and 76, extending from the mating face of the gear case member 14, that are adapted to be received in counterbores 77, 78 and 79 in gear case 16. Fasteners 81 extend through counterbores 77, 78 and 79 and are threaded into closed end bores 82 in the gear case member 14 within each of the annular projections 74, 75 and 76 to hold the gear case members 14 and 16 together.

Viewing FIG. 4, the axes of projections 74, 75 and 76 and the axes of the counterbores 77, 78 and 79 form an equilateral triangle and lie in a common circle having the same center 68 as the equilateral triangles formed by the bearing bores 26, 44 and 56 and bearing bores 60, 49 and 77, although displaced 60 degrees apart. The projections 74, 75 and 76 and counterbores 77, 78 and 79 are spaced 120 degrees apart on a circle defined by center 68. With this geometry, the gear case member 16 may be located in any one of three angularly related positions with respect to gear case 14 with one of the bearing bores 60, 49 and 37 in case 16 always lining up with one of the bearing bores 26, 44 and 56 in the case 14 (only two of these three positions are utilized as will appear hereinafter).

To seal the gear cases 14 and 16, a rib 83 is provided entirely around mating face 84 of gear case 14. This rib presses a seal 86 (see FIG. 2) against mating face 88 on gear case 16. Gear case 16 has a similar peripheral rib 89 on mating face 88 spaced inwardly from rib 83 in gear case 14 that presses seal 86 against mating face 84 of gear case member 14.

Figure 8:
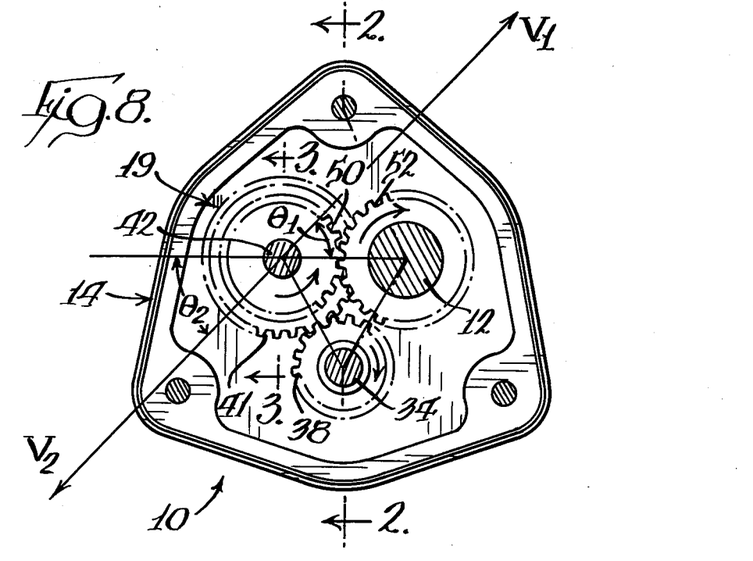
FIG. 8 is a schematic cross-section taken generally along line 4—4 of FIG. 2 looking toward the input gear case with the gearing arranged for clockwise rotation of the input gear.

Viewing FIG. 8, the gearing in adaptor 10 is illustrated viewed with the output gear case 16 removed looking back toward the input gear case 14. The gearing is illustrated in this view assembled for clockwise rotation of the input shaft 34 and input gear 38. The reaction forces $V_1$ and $V_2$ on the intermediate gear shaft 42 are the reaction force on shaft 42 imposed by the interengagement of input gear 38 with intermediate gear 41, and the reaction force on shaft 42 caused by the interengagement of intermediate gear 50 with output gear 52. The net reaction force on shaft 42 may be defined as $R = V_1 (\cosin \theta_1) + (-V_2)(\cosin \theta_2)$. Since $\theta_1$ equals $\theta_2$ the resultant forces on the intermediate shaft 42 are balanced and thus zero.

Figure 9:
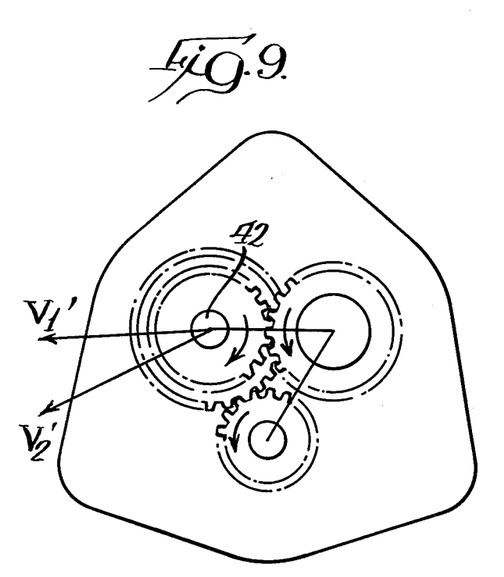
FIG. 9 is a schematic cross-section generally similar to FIG. 8, illustrating the vector forces that would occur upon counterclockwise rotation of the input shaft in the gearing arrangement illustrated in FIG. 8.

For purposes of illustration and comparison and as shown in FIG. 9, the counterclockwise rotation of input gear 38 with the same geometric relationship of the gearing illustrated in FIG. 8, produces forces acting on intermediate shaft 42 that are in substantially the same direction rather than in opposite directions.

Figure 10:
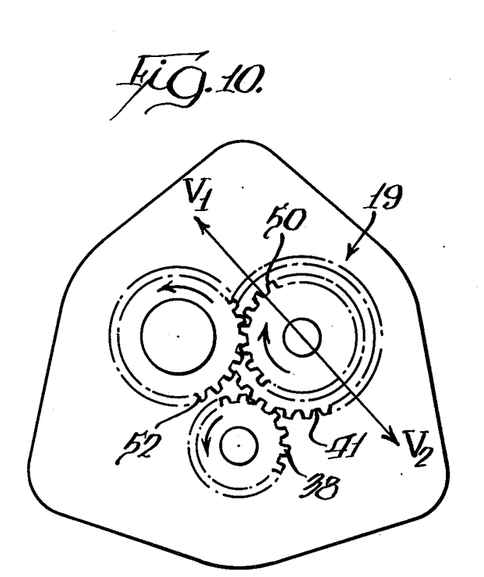
FIG. 10 is a schematic cross-section similar to FIG. 8 with the relative positions of the input and output gears reversed according to the present invention to balance the forces on the intermediate gear to accommodate counterclockwise rotation of the input gear.

According to the present invention, this unbalanced load on intermediate shaft 42 is eliminated and the forces balanced for counterclockwise input shaft rotation by reversing the effective positions of the input gear 38 and the output gear 52 with respect to the intermediate gearing 19 as shown in FIG. 10. This reversal is done during assembly of the adapter 10 and will be described with reference to FIGS. 11 and 12.

Figure 11:
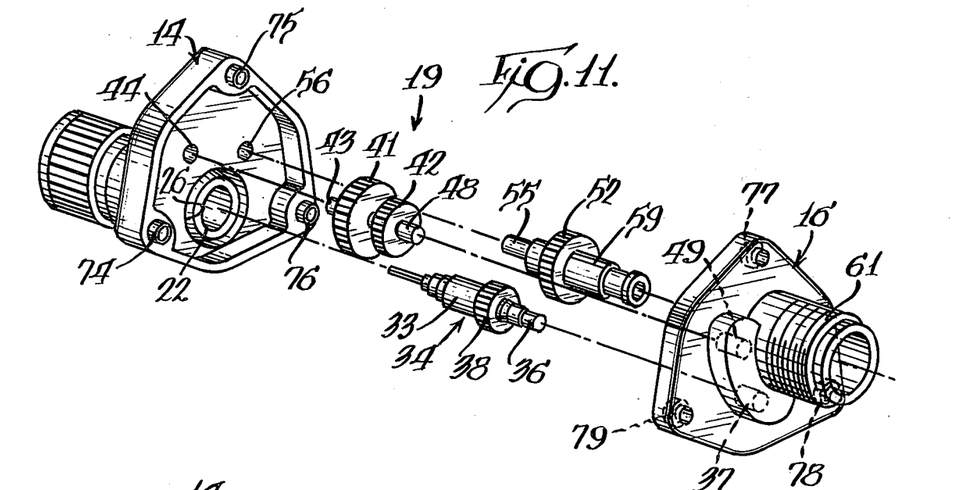
FIG. 11 is an exploded view of the adaptor illustrated in FIGS. 1 to 8 viewed from the output side illustrating the manner of of assembly for clockwise rotation of the input gear; and, FIG. 12 is an exploded view of the adaptor similar to FIG. 11 illustrating the manner of assembly for counterclockwise rotation of the input gear.

To assemble the adaptor 10 for clockwise rotation of input shaft 34 (clockwise rotation of input shaft 34 as viewed from the output side toward the gear case 14), the gearing and gear cases are assembled as illustrated in FIG. 11. This is also the position of the gearing and gear case members illustrated in FIGS. 1, 2, 3 and 8. Input shaft bearing portion 33 is assembled into bushing 22 in gear case 14, intermediate gearing shaft bearing portion 43 is inserted into secondary bearing 44, and output shaft bearing portion 55 is inserted into secondary bearing 56. The gear case 16 is then angularly oriented so that locating projections 74, 75 and 76 on gear case member 14 line up respectively with counterbores 79, 77 and 78 on adaptor 16. The gear case 16 then is mated with gear case member 14 inserting input shaft bearing portion 36 into secondary bearing 37 in gear case 16, intermediate gearing shaft bearing portion 48 into secondary bearing 49, and output shaft bearing portion 59 into bearing bore 60. This locates the gearing in the position indicated in FIG. 8 for clockwise rotation of input gear 38.

It should be understood with respect to this description of assembly, that the order of the steps of assembly described is illustrative only and that the parts may be assembled in a different, more expeditious order, the only importance lying in the assembled position of the gearing and gear cases.

Figure 12:
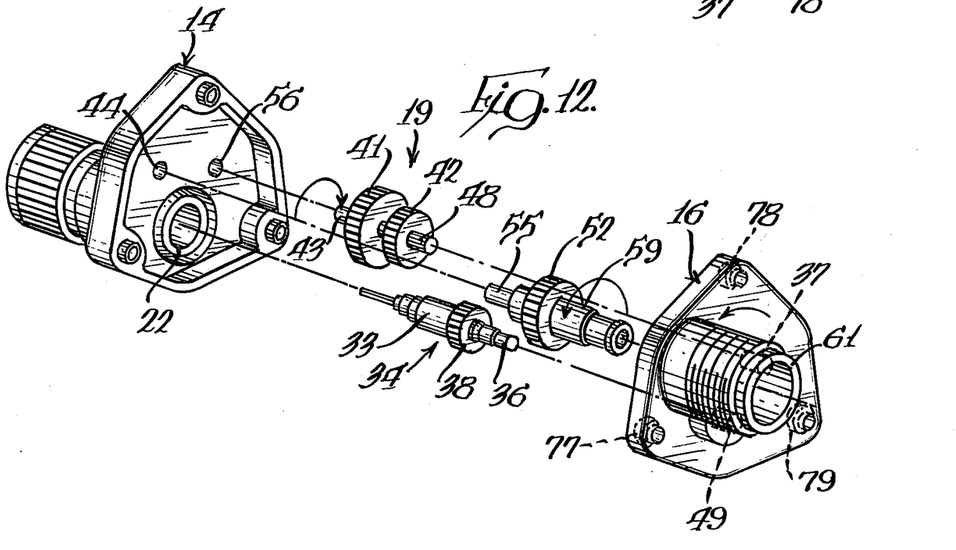

For counterclockwise rotation of the input shaft 34, the gearing in gear cases 14 and 16 are assembled in the positions illustrated in FIG. 12. In FIG. 12 the gear case member 14 is shown in its angular position illustrated in FIG. 11, and the gear case member 16 is illustrated rotated 120 degrees in a clockwise direction from its position illustrated in FIG. 11. This aligns secondary bearing bore 44 in gear case 14 with the output shaft bearing bore 60 in gear case 16, aligns secondary bearing bore 56 in gear case member 14 with bearing bore 37 in gear case 16, and aligns input shaft bushing 22 in gear case 14 with bearing bore 49 in gear case 16. Input shaft bearing portion 33 is inserted into input bushing 22, output shaft portion 55 is inserted into secondary bearing 44 and intermediate gear shaft portion 43 is inserted into secondary bearing bore 56 in gear case member 14. Gear case member 16 is mated with gear case member 14 inserting input shaft bearing portion 36 into counterbore 49, output shaft portion 59 into bearing bore 60, and intermediate gearing shaft portion 48 into counterbore 37. This assembly results in the location of the gears illustrated in FIG. 10 for counterclockwise rotation of the input shaft 34 and input gear 38.

The adaptor 10 can also be used to effect a reverse rotation drive, i.e., a drive in which the output shaft rotates in the opposite direction of the input shaft. Toward this end, the intermediate gearing 19 is eliminated and the input gearing 18 and the output gearing 20 modified so that the input and output gears directly engage.

What is claimed is:

1. A gearbox for obtaining the proper drive ratio between an element in the drive train of a vehicle and a speedometer or odometer, comprising; housing means, an input gear mounted for rotation in the housing means, intermediate gear means engaging the input gear and the output gear to rotate the output gear in the same direction and at a predetermined drive ratio with respect to the input gear, said input gear and output gear being positioned with respect to each other to react in generally opposite directions on the intermediate gear means upon rotation of the input gear in one direction, and means for substantially balancing the radial forces acting on the intermediate gear means by the input gear and the output gear in both directions of rotation of the input gear including said housing means being constructed to reverse the positions of the input and output gears relative to the intermediate gear means upon rotation of the input gear in the other direction so that the input gear and the output gear react in generally opposite directions against the intermediate gear means in either direction of rotation of the input gear.

2. A gearbox for obtaining the proper drive ratio between an element in the drive train of a vehicle and a speedometer or odometer, as defined in claim 1, wherein the input gear, the output gear, and the intermediate gear means are mounted for rotation about axes that together define an equilateral triangle to balance the forces imposed on the intermediate gear means.

3. A gearbox for obtaining the proper drive ratio between an element in the drive train of a vehicle and a speedometer or odometer, as defined in claim 1, wherein the housing means includes a first gear case rotatably supporting the input gear and a second gear case rotatably supporting the output gear, said intermediate gear means being supported in at least one of the first and second gear cases, said first and second gear cases being connectable in a first position with the axis of the input gear spaced from the axis of the output gear, and being connectable in a second position rotated from the first position to reverse the relative position of the input gear and the output gear with respect to the intermediate gear means.

4. A gearbox for obtaining the proper drive ratio between an element in the drive train of a vehicle and a speedometer or odometer, comprising; housing means, an input gear mounted for rotation in the housing means, an output gear mounted for rotation in the housing means, and intermediate gear means engaging the input gear and the output gear to rotate the output gear in the same direction and at a predetermined drive ratio with respect to the input gear, said input gear and output gear being positioned with respect to the input gear, said input gear and output gear being positioned with respect to each other to react in generally opposite directions on the intermediate gear means upon rotation of the input gear in one direction, said housing means being constructed to permit a reversal of the relative positions of the input and output gears upon rotation of the input gear in the other direction so that the input gear and the output gear react in generally opposite directions against the intermediate gear means in either direction of rotation of the input gear, the housing means including a first gear case rotatably supporting the input gear and a second gear case rotatably supporting the output gear, said intermediate gear means being supported in at least one of the first and second gear cases, said first and second gear cases being connectable in a first position with the axis of the input gear spaced from the axis of the output gear, and being connectable in a second position rotated from the first position to change the relative position of the input gear and the output gear with respect to the intermediate gear means, the first gear case having first bearing means therein to support the input gear and second and third bearing means therein for supporting either the intermediate gear means or the output gear, said first, second and third bearings means in the first gear case being located on axes defining an equilateral triangle, said second gear case having a first bearing means therein for supporting the output gear, and a second and third bearing means therein for supporting either the intermediate gear means or the input gear, said first, second and third bearing means in the second gear case being located on axes defining an equilateral triangle equal to the first gear case equilateral triangle and being coincident therewith, said equilateral triangles having apexes lying in a common circle having a center, and fastening elements on the first gear case and the second gear case member spaced 120 degrees apart with respect to the center so that the first gear case member may be positioned in either of said first and second positions.

5. A gearbox for obtaining the proper drive ratio between an element in the drive train of a vehicle and a speedometer or odometer, comprising; housing means, an input gear mounted for rotation in the housing means, an output gear mounted for rotation in the housing means, and intermediate gear means engaging the input gear and the output gear to rotate the output gear in the same direction and at a predetermined drive ratio with respect to the input gear, and said input gear, said output gear and said intermediate gear means being rotatable on axes defining an equilateral triangle so that upon rotation of the input shaft in one direction the radial forces inposed of the intermediate gear means by the input gear are generally equal and opposite the forces imposed on the intermediate gear means by the output gear, said housing means including means for balancing the radial forces imposed on the intermediate gear means upon rotation of the input shaft in the other direction.

6. A gearbox for obtaining the proper drive ratio between an element in the drive train of a vehicle and a speedometer or odometer, comprising; housing means, an input gear mounted for rotation in the housing means, an output gear mounted for rotation in the housing means, intermediate gear means engaging the input gear and the output gear to rotate the output gear in the same direction and at a predetermined drive ratio with respect to the input gear, said input gear, said output gear and said intermediate gear means being rotatable on axes defining an equilateral triangle so that upon rotation of the input shaft in one direction the radial forces imposed on the intermediate gear means by the input gear will be generally equal and opposite the forces imposed on the intermediate gear means by the output gear, the axes of the input gear, the intermediate gear means and the output gear lying on a common circle having a center, a first gear case member supporting the input gear, and a second gear case member supporting the output gear, said first gear case member and said second gear case member being positionable in two positions rotated 120 degrees with respect to the center to reverse the relative positions of the input gear and the output gear relative to the intermediate gear means.

7. A gearbox for obtaining the proper drive ratio between an element in the drive train of a vehicle and a speedometer or odometer, comprising; housing means, an input gear mounted for rotation in the housing means, an output gear mounted for rotation in the housing means, and intermediate gear means engaging the input gear and the output gear to rotate the output gear in the same direction and at a predetermined drive ratio with respect to the input gear, and said input gear, said output gear and said intermediate gear means being rotatable on axes defining an equilateral triangle so that upon rotation of the input shaft in one direction the forces imposed on the intermediate gear means by the input gear will be generally opposite the forces imposed on the intermediate gear means by the output gear, said housing means being adapted to accommodate a reversal of the positions of the input gear and the output gear with respect to the intermediate gear means.

8. A gearbox for obtaining the proper drive ratio between an element in the drive train of a vehicle and a speedometer or odometer, comprising; housing means, an input gear mounted for rotation in the housing means, an output gear mounted for rotation in the housing means, intermediate gear means engaging the input gear and the output gear to rotate the output gear in the same direction and at a predetermined drive ratio with respect to the input gear, said input gear, said output gear and said intermediate gear means being rotatable on axes defining an equilateral triangle so that upon rotation of the input shaft in one direction the radial forces imposed on the intermediate gear means by the input gear will be generally equal and opposite the forces imposed on the intermediate gear means by the output gear, including a first gear case member supporting the input gear, a second gear case member supporting the output gear, said first gear case member having first bearing means therein to support the input gear, and second and third bearing means therein for supporting either the intermediate gear means or the output gear, said first, second and third bearing means in the first gear case member being located on axes defining an equilateral triangle, said second gear case member having a first bearing means therein for supporting the output gear, and second and third bearing means therein for supporting either the intermediate gear means or the input gear, said first, second and third bearing means in the second gear case member being located on axes defining an equilateral triangle equal to the first gear case equilateral triangle and being coincident therewith, said equilateral triangle having apexes lying in a common circle having a center, and fastening elements on the first gear case member and the second gear case member spaced 120 degrees apart with respect to said center so that the first gear case member may be positioned in either of said first and second positions.

9. A gearbox for obtaining the proper drive ratio between a driven element in a vehicle drive train and a speedometer or odometer, comprising; a first generally cup-shaped gear case member, said first gear case member having first, second and third bearing means therein having axes arrayed in triangular configuration, a second generally cup-shaped gear case member connected to said first gear case member and having first, second and third bearing means therein having axes arrayed in triangular configuration coincident with the triangular configuration of the axes in the first gear case member, input gear means supported in the first bearing means in the first gear case member and the third bearing means in the second gear case member, intermediate gear means engaging and driven by the input gear means, said intermediate gear means being supported in the second bearing means in the first gear case member and the second bearing means in the second gear case member, and output gear means engaging and driven by the intermediate gear means, said output gear means being supported in the third bearing means of the first gear case member and the first bearing means of the second gear case member, said first and second gear case members being shiftable so that the first, second and third bearing means in the first gear case member and the first, second and third bearing means in the second gear case member are positioned to alternatively permit the input gear means to be supported in the first bearing means in the first gear case member and the second bearing means in the second gear case member, the intermediate gear means to be supported in the third bearing means in the first gear case member and the third bearing means in the second gear case member, and the output gear means to be supported in the second bearing means in the first gear case member and the first bearing means of the second gear case member.

10. A gearbox for obtaining the proper drive ratio between a driven element in a vehicle drive train and a speedometer or odometer, as defined in claim 9, wherein the first, second and third bearing means in the first gear case member are located on axes defining a first equilateral triangle, said first, second and third bearing means in the second gear case member being located on axes defining a second equilateral triangle equal to and coincident with the first equilateral triangle.

11. A gearbox for obtaining the proper drive ratio between a driven element in a vehicle drive train and a speedometer or odometer, as defined in claim 9, wherein the first gear case member and the second gear case member are constructed of plastic, said first bearing means in the first gear case member being a metal bushing and said input gear means, said intermediate gear means and said output gear means being metal.

12. A gearbox for obtaining the proper drive ratio between a driven element in a vehicle drive train and a speedometer or odometer, as defined in claim 9, including three equilaterally spaced fastening members for connecting the first gear case member to the second gear case member.

13. A gearbox for obtaining the proper drive ratio between a driven element in a vehicle drive train and a speedometer or odometer, comprising; a first generally triangular cup-shaped gear case having first, second and third bearing means therein located on axes defining an equilateral triangle, a second generally triangular cup-shaped gear case having first, second and third bearing means therein located on axes defining a second equilateral triangle equal to and coincident with the first equilateral triangle, said equilateral triangles having apexes located on a common circle defined about a center, locating means on the first and second gear cases permitting the second gear case to be located with respect to the first gear case in 120 degree spaced positions with respect to the center, an input gear assembly including an input shaft supported in the first bearing means in the first gear case and one of the second or third bearing means in the second gear case, an input gear on the input shaft, an intermediate gear assembly including an intermediate shaft mounted in one of the second or third bearing means in the first gear case and one of the second and third bearing means in the second gear case, a first intermediate gear on the intermediate shaft engaging and driven by the input gear, a second intermediate gear on the intermediate shaft, an output gear assembly having an output shaft supported in one of the second and third bearing means in the first gear case and the first bearing means in the second gear case, and an output gear on the output shaft engaging and being driven by the second intermediate gear, said first gear case being selectively positionable with regard to the second gear case in two 120 degree spaced positions to reverse the positions of the input gear assembly and the output gear assembly relative to the intermediate gear assembly.

14. A gearbox for obtaining the proper drive ratio between a driven element in a vehicle drive train and a speedometer or odometer, as defined in claim 13, wherein the first and second gear cases are constructed of plastic, and the input, intermediate and output gear assemblies are constructed of steel.

15. A gearbox for obtaining the proper drive ratio between an input shaft and an output shaft, comprising; an input housing member and an output housing member, fastening means for the housing members that selectively connects the housing members together in either of the first and second 120 degrees angularly spaced positions, said member means having a geometric axis common to both of the connected positions thereof, an input gear bearing and first and second bearings in the input housing member all having axes lying on a common circle having a center on the geometric axis of the housing members, an output gear bearing and third and fourth bearings in the output housing member all having axes lying on a common circle also having a center on the geometric axes of the housing members, an input gear assembly rotatably mounted at one end in the input gear bearing in both the first and second positions of the housing members and at the other end in the third bearing in the first position of the housing members and the fourth bearing in the second position of the housing members, an output gear assembly rotatably mounted at one end in the output gear bearing in both positions of the housing members and at the other end in the first bearing in the first position of the housing members and in the second bearing in the second position of the housing members, and an intermediate gear assembly interengaging both the input gear assembly and the output gear assembly and rotatably mounted at one end in the fourth bearing in the first position of the housing members and in the third bearing in the second position of the housing members, and at the other end in the second bearing in the first position of the housing members and in the first bearing in the second position of the housing members.

16. A gearbox for obtaining the proper drive ratio between an input shaft and an output shaft, comprising; an input housing member and an output housing member, fastening means for the housing members that selectively connects the housing members together in either of a first or second 120 degree angularly spaced positions, said member means having a geometric axes common to both of the connected positions thereof, an input gear bearing and first and second bearings in the input housing member all having axes lying on a common circle having a center on the geometric axes of the housing members, an output gear bearing and third and fourth bearings in the output housing member all having axes lying on a common circle also having a center on the geometric axes of the housing members, an input gear assembly rotatably mounted in the input bearing, an output gear assembly rotatably mounted in the output bearing, and an intermediate gear assembly interengaging the input gear assembly and the output gear assembly, and rotatably mounted at one end in the fourth bearing in the first position of the housing members and in the third bearing in the second position of the housing members, and at the other end in the second bearing in the first position of the housing members and in the first bearing in the second position of the housing members.

* * * * *